(12) United States Patent
Sirola et al.

(10) Patent No.: US 11,421,392 B2
(45) Date of Patent: Aug. 23, 2022

(54) METALLIC STRUCTURE WITH WATER IMPERMEABLE AND ELECTRICALLY CONDUCTIVE CEMENTITIOUS SURROUND

(71) Applicant: SHORE ACRES ENTERPRISES INC., Barrie (CA)

(72) Inventors: Brien Todd Sirola, Barrie (CA);
Christopher Paul Berni, Barrie (CA);
Donald Brien Sirola, Barrie (CA);
Caitlin Emma Morrissey Hughes, Barrie (CA)

(73) Assignee: SHORE ACRES ENTERPRISES INC., Barrie (CA)

( * ) Notice: Subject to any disclaimer, the term of this patent is extended or adjusted under 35 U.S.C. 154(b) by 220 days.

(21) Appl. No.: 16/837,284

(22) Filed: Apr. 1, 2020

(65) Prior Publication Data

US 2021/0189677 A1   Jun. 24, 2021

Related U.S. Application Data

(60) Provisional application No. 62/949,489, filed on Dec. 18, 2019.

(51) Int. Cl.
*H02G 9/02* (2006.01)
*E02D 5/80* (2006.01)

(52) U.S. Cl.
CPC ............. *E02D 5/80* (2013.01); *H02G 9/025* (2013.01); *E02D 2300/002* (2013.01)

(58) Field of Classification Search
CPC .......... H02G 9/025; E02D 5/80; H01B 13/32; Y02A 30/14
See application file for complete search history.

(56) References Cited

U.S. PATENT DOCUMENTS

| 2,196,172 A |   | 6/1837 | Billings et al. |
| 1,661,712 A |   | 3/1928 | Wagner |
| 2,207,134 A | * | 7/1940 | Staples ............ H01R 4/66 |
|             |   |        | 174/7 |
| 2,495,466 A |   | 1/1950 | Miller |
| 2,553,654 A |   | 5/1951 | Heise |
| 3,072,558 A |   | 1/1963 | Myers et al. |
| 3,243,753 A |   | 3/1966 | Fred |
| 3,334,040 A |   | 8/1967 | Conrad et al. |

(Continued)

FOREIGN PATENT DOCUMENTS

| GB | 1424162 A | 2/1976 |
| JP | 05198321 A | 8/1993 |

(Continued)

OTHER PUBLICATIONS

Electrically Conductive Adhesives—Henkel, https://www.henkel-adhesives.com/us/en/products/industrial-adhesives/electrically-conductive-adhesives.html.

*Primary Examiner* — Sean D Andrish
(74) *Attorney, Agent, or Firm* — Arm Intellectual Property Inc.; Adrienne Bieber McNeil (57) ABSTRACT

An electrically grounded and corrosion-protected assembly includes a metallic structure. At least a portion of the metallic structure is buried in the earth. A water impermeable and electrically conductive cementitious surround is applied to at least a section of the portion that is buried in the earth. The surround is in direct contact with the section and is between the section and the earth.

27 Claims, 6 Drawing Sheets

(56) References Cited

U.S. PATENT DOCUMENTS

| | | |
|---|---|---|
| 3,573,427 A | 4/1971 | Minsk |
| 3,616,354 A | 10/1971 | Russell |
| 3,716,649 A | 2/1973 | Walker et al. |
| 3,725,669 A | 4/1973 | Tatum |
| 3,725,699 A | 4/1973 | Pascoe |
| 3,876,819 A | 4/1975 | Boyd et al. |
| 3,917,781 A | 11/1975 | Gabriel et al. |
| 3,927,163 A | 12/1975 | Gabriel et al. |
| 3,941,918 A | 3/1976 | Nigol et al. |
| 3,962,142 A | 6/1976 | Freeman et al. |
| 4,017,569 A | 4/1977 | Hass |
| 4,018,715 A | 4/1977 | Tatum |
| 4,144,077 A | 3/1979 | Gallus |
| 4,170,532 A | 10/1979 | Tatum |
| 4,175,021 A | 11/1979 | Tatum et al. |
| 4,192,963 A | 3/1980 | Koehmstedt |
| 4,367,168 A | 1/1983 | Kelly |
| 4,400,259 A | 8/1983 | Schutt |
| 4,407,676 A | 10/1983 | Restrepo |
| 4,414,030 A | 11/1983 | Restrepo |
| 4,442,903 A | 4/1984 | Schutt et al. |
| 4,472,468 A | 9/1984 | Tailor et al. |
| 4,544,464 A | 10/1985 | Bianchi et al. |
| 4,710,644 A | 12/1987 | Baach |
| 4,786,388 A | 11/1988 | Tatum, Jr. |
| 4,799,959 A | 1/1989 | Fourez et al. |
| 4,818,439 A | 4/1989 | Blackledge et al. |
| 4,871,395 A | 10/1989 | Sugama |
| 4,908,157 A | 3/1990 | Fontana et al. |
| 5,026,468 A | 6/1991 | Carpenter et al. |
| 5,026,508 A | 6/1991 | Tatum, Jr. et al. |
| 5,040,599 A | 8/1991 | Pfalser et al. |
| 5,055,166 A | 10/1991 | Schutt |
| 5,070,597 A | 12/1991 | Holt et al. |
| 5,080,773 A | 1/1992 | Tatum, Jr. et al. |
| 5,098,771 A | 3/1992 | Friend |
| 5,139,634 A | 8/1992 | Carpenter et al. |
| 5,143,649 A | 9/1992 | Blackledge et al. |
| 5,167,710 A | 12/1992 | Leroux et al. |
| 5,174,871 A | 12/1992 | Russell |
| 5,207,530 A | 5/1993 | Brooks et al. |
| 5,254,228 A | 10/1993 | Westhof et al. |
| 5,294,396 A | 3/1994 | Dressel et al. |
| 5,370,783 A | 12/1994 | Carlson et al. |
| 5,413,689 A | 5/1995 | Nora et al. |
| 5,447,564 A | 9/1995 | Xie et al. |
| 5,476,612 A | 12/1995 | Wessling et al. |
| 5,507,933 A | 4/1996 | Nora et al. |
| 5,525,208 A | 6/1996 | Pritula et al. |
| 5,547,311 A | 8/1996 | Kenda |
| 5,550,176 A | 8/1996 | Lewis et al. |
| 5,609,748 A | 3/1997 | Kotowski et al. |
| 5,700,398 A | 12/1997 | Angelopoulos et al. |
| 5,753,861 A | 5/1998 | Hansen et al. |
| 5,908,584 A | 6/1999 | Bennett |
| 5,976,419 A | 11/1999 | Hawkins et al. |
| 6,022,469 A | 2/2000 | Page |
| 6,121,543 A | 9/2000 | Hallmark |
| 6,193,443 B1 | 2/2001 | Trudeau et al. |
| 6,193,857 B1 | 2/2001 | Davison et al. |
| 6,303,017 B1 | 10/2001 | Page et al. |
| 6,821,336 B1 | 11/2004 | Ramme et al. |
| 7,186,321 B2 | 3/2007 | Benham |
| 7,405,247 B2 | 7/2008 | Sachdev et al. |
| 7,422,789 B2 | 9/2008 | Avakian et al. |
| 7,540,776 B2 | 6/2009 | Graeve et al. |
| 7,619,161 B2 | 11/2009 | Okabayashi et al. |
| 7,745,528 B2 | 6/2010 | Prud'Homme et al. |
| 7,794,626 B2 | 9/2010 | Horton |
| 8,081,415 B2 | 12/2011 | Nolletti |
| 9,252,503 B2 | 2/2016 | Nolletti |
| 10,109,392 B2 | 10/2018 | Maunder et al. |
| 10,262,773 B2 * | 4/2019 | Sirola ............... H01B 7/2806 |
| 10,280,580 B1 | 5/2019 | Goff et al. |
| 10,333,234 B2 | 6/2019 | Simla et al. |
| 10,433,371 B2 | 10/2019 | Miller |
| 10,665,364 B2 * | 5/2020 | Sirola ............... H01B 7/2806 |
| 2002/0162484 A1 | 11/2002 | Ramme et al. |
| 2004/0099982 A1 | 5/2004 | Sirola et al. |
| 2005/0194576 A1 | 9/2005 | Sirola et al. |
| 2007/0187854 A1 | 8/2007 | Sirola et al. |
| 2008/0217041 A1 | 9/2008 | Kim |
| 2009/0233470 A1 | 9/2009 | Kim |
| 2010/0159148 A1 | 6/2010 | Hagens et al. |
| 2013/0048917 A1 | 2/2013 | Virtanen et al. |
| 2013/0168126 A1 | 7/2013 | Kuchta et al. |
| 2014/0251793 A1 | 9/2014 | Funahashi et al. |
| 2015/0028247 A1 | 1/2015 | Peters |
| 2015/0133593 A1 | 5/2015 | Kissell et al. |
| 2015/0282471 A1 | 10/2015 | Lampman et al. |
| 2016/0115293 A1 | 4/2016 | Aksay et al. |
| 2016/0163419 A1 | 6/2016 | Sirola et al. |
| 2019/0103684 A1 | 4/2019 | Sirola et al. |
| 2019/0256670 A1 | 8/2019 | Konno |
| 2021/0044034 A1 * | 2/2021 | LaBarge ............... H01R 4/62 |

FOREIGN PATENT DOCUMENTS

| | | |
|---|---|---|
| KR | 101089543 B1 | 12/2011 |
| WO | 1997014196 A1 | 4/1997 |
| WO | 1997032936 A1 | 9/1997 |

* cited by examiner

METALLIC STRUCTURE WITH WATER IMPERMEABLE AND ELECTRICALLY CONDUCTIVE CEMENTITIOUS SURROUND

CROSS REFERENCES TO RELATED APPLICATIONS

This application claims the benefit of and/or priority from U.S. Provisional Patent Application No. 62/949,489, filed on Dec. 18, 2019, which is incorporated herein by reference in its entirety.

TECHNICAL FIELD

This document relates to metallic structures, such as metallic poles (e.g. utility poles) and/or anchor rods for guy wires. More specifically, this document relates to the electrical grounding of such structures, the protection of buried portions of such structures from corrosion, and the support of such structures.

BACKGROUND

U.S. Pat. No. 10,262,773 (Sirola et al.) discloses a method for protecting a conductive metal from corrosion, including coating the conductive metal with a water impermeable carbonaceous conductive material to protect the conductive metal from corrosion.

SUMMARY

This summary is intended to introduce the reader to the subject matter of the detailed description, and is not intended to define or delimit any invention.

Electrically grounded and corrosion-protected assemblies are disclosed. According to some aspects, an electrically grounded and corrosion-protected assembly includes a metallic structure. At least a portion of the metallic structure is buried in the earth. A water impermeable and electrically conductive cementitious surround is applied to at least a section of the portion that is buried in the earth. The surround is in direct contact with the section and is between the section and the earth.

In some examples, the surround has a top edge, and the assembly further includes a diverter positioned on the top edge and extending around the metallic structure. The diverter is shaped to direct water away from the metallic structure.

In some examples, the metallic structure is a pole. In some examples, the metallic structure is an anchor rod. In some examples, the metallic structure is a cladding on a non-metallic structure.

In some examples, the cementitious surround includes a cementitious matrix and a particulate carbonaceous material dispersed in the cementitious matrix. The cementitious matrix can include Portland cement. The particulate carbonaceous material can include calcined petroleum coke. The cementitious surround can include between 5 wt % and 70 wt % Portland cement, and between 30 wt % and 90 wt % calcined petroleum coke. The cementitious surround can include up to 50% slag.

In some examples, the surround has a compressive strength of at least 50 psi.

In some examples, the assembly further includes an electrically conductive and water impermeable jacket encasing the surround. The jacket can include a polymeric matrix, and a particulate carbonaceous material dispersed in the polymeric matrix.

In some examples, the assembly further includes an electrically conductive and water impermeable brace embedded in the surround and supporting the metallic structure. The brace can include a polymeric matrix, and a particulate carbonaceous material dispersed in the polymeric matrix.

In some examples, the surround holds the metallic structure in a generally vertical position.

A method for electrically grounding and corrosion-protecting a metallic structure is also disclosed. According to some aspects, the method includes a) applying a cementitious product to at least a section of a metallic structure, wherein the cementitious product includes a cementitious matrix and a particulate carbonaceous material dispersed in the matrix; and b) curing the cementitious product to form a water impermeable and electrically conductive cementitious surround on the section.

In some examples, the method further includes, prior to step a), digging a hole in the earth for the metallic structure, wherein the hole is sized to leave a gap between the metallic structure and the earth, and lowering at least a bottom portion of the metallic structure into the hole. The section can be a section of the bottom portion.

In some examples, the cementitious product is a cementitious slurry. The method can further include combining a cementitious powder with water to form the cementitious slurry. The cementitious powder can be combined with the water in a ratio of less than or equal to 3 US gallons of water per 55 lb of cementitious powder. The cementitious powder can be combined with the water in a ratio of between about 1.5 and about 3.0 US gallons of water per 55 lb of cementitious powder. The method can further include applying the cementitious slurry to the hole before lowering at least the bottom portion of the metallic structure into the hole. Lowering the bottom portion of the metallic structure into the hole can force the slurry to fill the gap or the bottom portion of the pole.

In some examples, the cementitious product is a cementitious powder, and the method further includes adding water to the cementitious powder.

In some examples, the method further includes, prior to step a), applying a jacket to the section. The jacket can be sized to leave a gap around the section.

In some examples, the metallic structure is a pole or an anchor rod for a guy wire or a cladding on a non-metallic pole.

In some examples, the surround has a width of between about 0.5 inch and about 10 inches.

In some examples, the method further includes applying a diverter around a top edge of the surround, to direct water away from the metallic structure.

In some examples, the cementitious matrix includes Portland cement. In some examples, the particulate carbonaceous material includes calcined petroleum coke.

In some examples, the cementitious surround includes between 5 wt % and 70 wt % Portland cement, and between 30 wt % and 90 wt % calcined petroleum coke. The cementitious surround can include up to 50% slag.

In some examples, the method further includes bracing the metallic structure with at least one brace. The brace can be electrically conductive and water impermeable. Bracing the metallic structure can include embedding the brace in the surround.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Disclosed herein is a cementitious product that, when in its cured state, forms a water impermeable and electrically conductive surround for buried portions (e.g. bottom portions) of metallic structures, or for sections of such buried portions. Such structures can include those used in the electrical power distribution and transmission industry, or in the telecommunications industry, or in the street lighting industry, or in various other industries. For example, metallic structures can include poles (e.g. steel poles) such as utility poles or telecommunications poles or street lighting poles. For further example, metallic structures can include anchor rods for guy wires. For further example, metallic structures can include metallic parts of ancillary structures (e.g. metal claddings on non-metallic structures such as concrete poles or composite poles or wood poles). The cementitious product can be used to facilitate installation of the metallic or ancillary structure (i.e. can set and support a metallic utility pole or metal-clad non-metallic utility pole, to hold the utility pole in a generally vertical position), provide electrical grounding to the metallic or ancillary structure, and protect the buried portion of the metallic structure (or the section thereof) from corrosion.

The cementitious product can be applied to the metallic structure in situ. For example, the bottom portion of a metallic utility pole can be placed in a hole that has been dug in the earth (e.g. into a hole dug for the utility pole using an auger). The cementitious product, in slurry form or in powder form, can be poured around the bottom portion of the utility pole so that it is in direct contact with the utility pole. The cementitious product can cure in-situ around the bottom portion of the utility pole (e.g. the slurry can cure in-situ, or the powder can absorb environmental water (e.g. rain water) and then cure in-situ), so that the cementitious product is between the utility pole and the earth and can form a barrier between the utility pole and the earth. When cured, the cementitious product can form a surround around the bottom portion of the utility pole that (1) anchors the utility pole in the earth (i.e. holds up or helps to hold up or supports or sets the utility pole in a generally vertical position, so that a separate backfill material is not necessarily required); (2) is water impermeable to protect the bottom portion of the utility pole from corrosion; and (3) is electrically conductive to electrically ground the utility pole (e.g. to protect the utility pole from lightning strikes and power-line ground faults and prevent electrical fires).

As used herein, the term 'cementitious product' refers to a product that has a cementitious matrix—i.e. a matrix that is a cement (e.g. Portland cement), or consists essentially of a cement, or is made up largely of a cement (i.e. at least 20% by weight of the matrix is a cement). Various components, as described below, can be dispersed in (or otherwise mixed with) the cementitious matrix. The term 'cementitious product' can refer to a dry product (also referred to herein as a 'cementitious powder'), a wet product (also referred to herein as a 'cementitious slurry'), or a solid product (also referred to herein as a 'cementitious surround' or simply as a 'surround').

As used herein, the term 'electrically-conductive' indicates that the cementitious surround has an electrical resistivity of less than or equal to 10,000 ohm·cm. For example, the cementitious surround may have an electrical resistivity of less than 500 ohm·cm, or between 2.0 ohm·cm and 5.0 ohm·cm.

As used herein, the term 'water-impermeable' indicates that the surround has a water permeability of less than or equal to $10^{-5}$ cm/s. For example, the surround may have a water permeability of $2.0 \times 10^{-8}$ cm/s.

As used herein, the term 'in situ' indicates that cementitious product is applied to the metallic structure at the installation location of the metallic structure. For example, the statement that 'the cementitious product can be applied to the utility pole in situ' indicates that the cementitious product can be applied to a bottom portion of the utility pole after a hole has been dug and the bottom end of the utility pole has been positioned in the hole.

The cementitious products disclosed herein generally include a particulate carbonaceous material (e.g. calcined petroleum coke) dispersed in the cementitious matrix (e.g. Portland cement). When cured, the cementitious matrix may provide the product with water impermeability, to protect the buried portion (or a section of the buried portion) of the metallic structure from corrosion, and the particulate carbonaceous material may provide the product with electrical conductivity, to electrically ground the metallic structure. For example, a cementitious powder can include a mixture of calcined petroleum coke, Portland cement, and optionally slag. In some examples, the cementitious powder can include a mixture of 50 wt % calcined petroleum coke and 50 wt % Portland cement. In other examples, the cementitious powder can include a mixture of between about 30 wt % and 90 wt % calcined petroleum coke, between about 5 wt % and 70 wt % Portland cement, and between about 1 wt % and 50 wt % slag.

In order to form the cementitious surround, the cementitious powder can be combined with water to form a slurry, which can then be applied in direct contact to the metallic structure in situ (e.g. poured into a hole that has been dug for a utility pole) and allowed to cure. In some examples, the cementitious powder can be combined with water in a ratio of less than or equal to about 3 US gallons of water per 55 lb of cementitious powder, for example between about 1.5 US gallons and 3.0 US gallons of water per 55 lb of cementitious powder. In one particular example, the cementitious powder can be combined with water in a ratio of about 2.0 US gallons of water per 55 lb of cementitious powder. This ratio may be particularly useful where the surround is formed on a utility pole. In another example, the cementitious powder can be combined with water in a ratio of about 2.5 US gallons of water per 55 lb of cementitious powder. This ratio may be particularly useful where the surround is formed on an anchor rod. Such cementitious slurries can be generally thick and have low slump.

Alternatively, the initial step of combining with water can be omitted, and the cementitious powder can be applied in direct contact to the metallic structure in situ (e.g. poured into a hole that has been dug for a utility pole). Water can then be added to the cementitious powder in-situ, or the cementitious powder can be left and allowed to absorb environmental water (e.g. rainwater). The cementitious product can then be allowed to cure.

The cementitious products disclosed herein can in some examples have a generally low drying shrinkage, e.g. a drying shrinkage of less than or equal to about 0.20% after curing for 28 days, or a drying shrinkage of less than about 0.015% after curing for 28 days.

After curing, the cementitious surround can be relatively strong—i.e. can have a compressive strength of greater than or equal to about 50 psi (i.e. greater than about 0.34 MPa). For example, the compressive strength can be greater than 2000 psi (about 13.79 MPa), or about 4003 psi (about 27.6 MPa) or about 4350 psi (about 30 MPa), or about 914 psi (about 6.30 MPa), or about 624 psi (about 4.30 MPa), or about 348 psi (about 2.40 MPa), or about 174 psi (about 1.20 MPa), or about 65 psi (about 0.45 MPa) after curing (e.g. after 28 days of curing).

Figure 1:
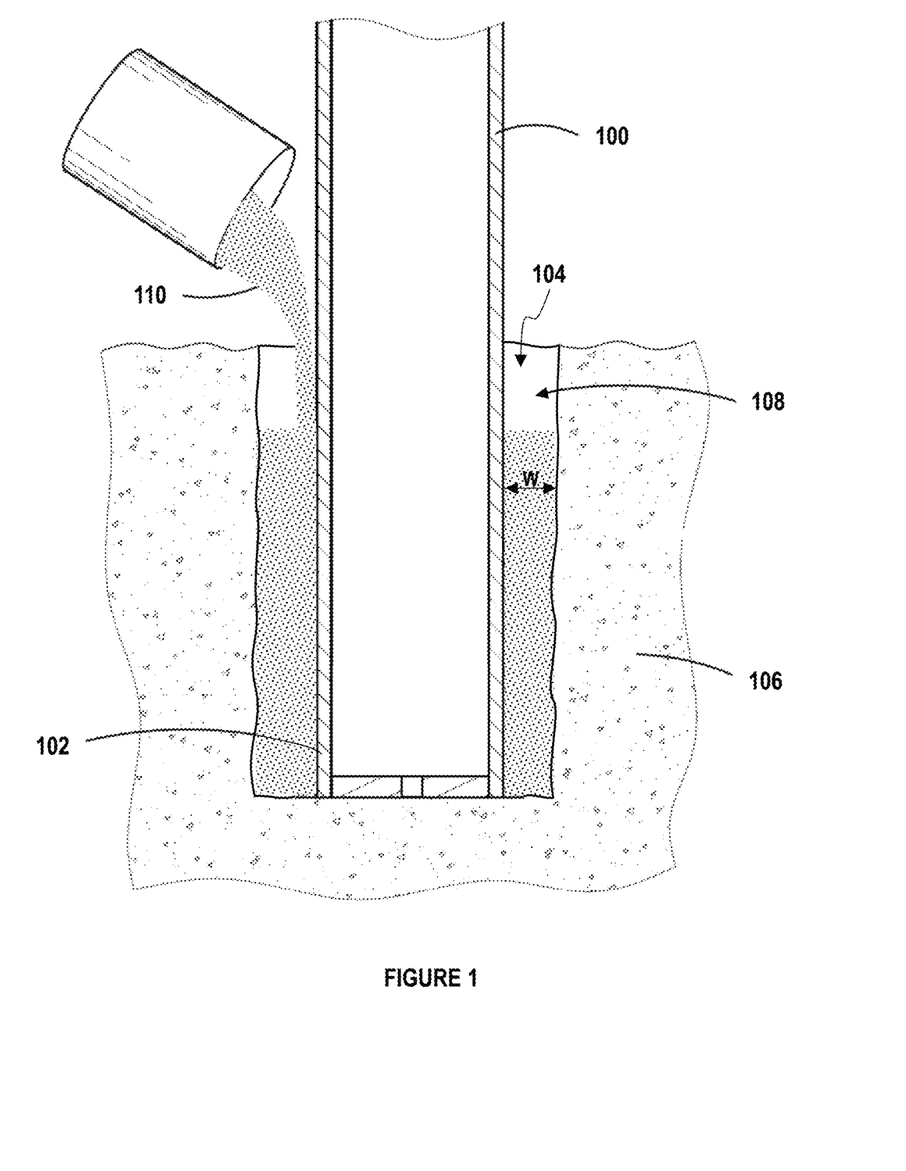
FIG. 1 is a partial and schematic cross-sectional view showing a cementitious slurry being applied to a bottom portion of a utility pole.
Figure 2:
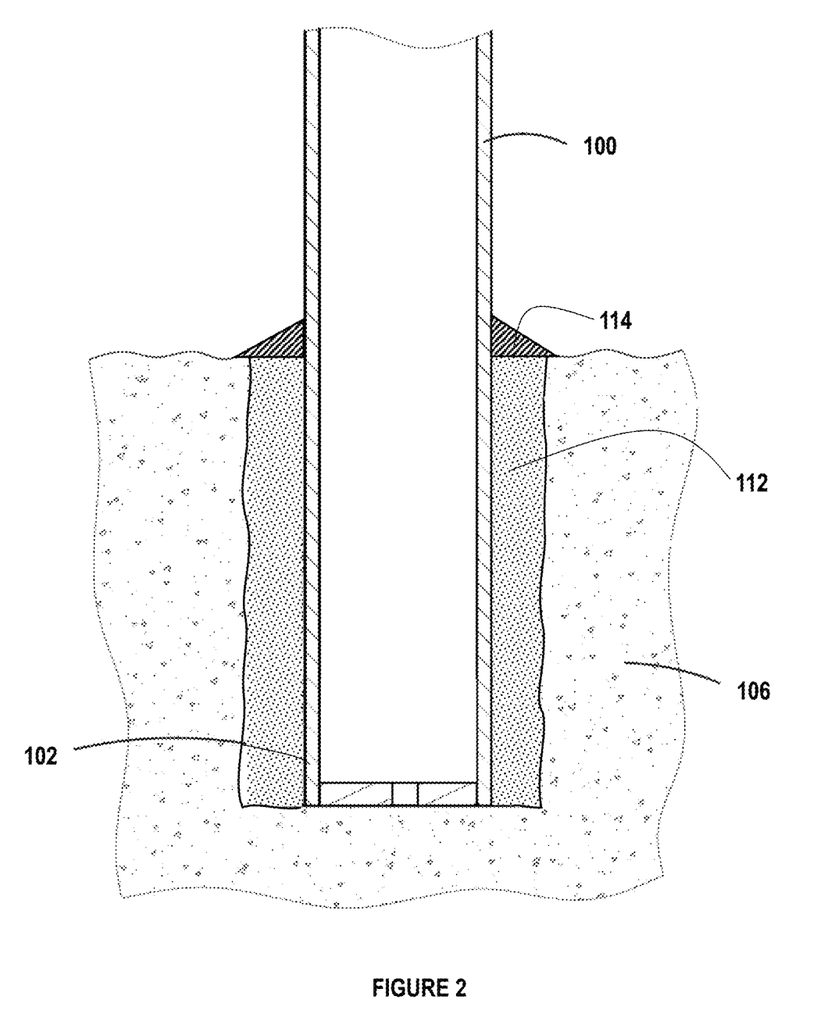
FIG. 2 is a partial and schematic cross-sectional view showing a utility pole with a cementitious surround applied thereto.

Referring now to FIG. 1, an assembly is shown that includes a metallic (e.g. steel) utility pole 100 in situ. A portion (i.e. the bottom portion 102) of the utility pole has been lowered into a hole 104 that has been dug in the earth 106 (e.g. dug into the earth 106 with an auger or a hydrovac or any other technique that involves removal of soil to create a hole). The hole 104 can be sized to have a diameter that is slightly larger than the utility pole 100, to leave a circumferential gap 108 between the utility pole 100 and the earth 106. The gap 108 can have a width W of, for example, between 0.5 inch and 10 inches, or between 1 inch and 6 inches. With the utility pole in this position, a cementitious slurry 110 as described above can be applied to the bottom portion 102 of the utility pole 100, for example by pouring the cementitious slurry into the gap 108 (although FIG. 1 shows the slurry 110 being poured from a pot, it may also be poured from a cement truck or other container). Alternatively, the cementitious slurry can first be applied to the hole, and the bottom portion of the utility pole can then be lowered into the hole and pressed into the slurry. If the bottom portion of the utility pole is closed as shown, this can cause the slurry to rise and fill the gap, or, if the bottom portion of the utility pole is open (not shown), the slurry can fill the bottom portion as well as the gap. A concrete vibrator can optionally be used to remove air trapped in the slurry. The slurry can then be left to cure, for example over a period of several days, to form the surround 112, as shown in FIG. 2. As mentioned above, the surround 112 is between the bottom portion 102 of the utility pole 100 and the earth 106 and can form a barrier between the bottom portion 102 of the utility pole 100 and the earth 106, is electrically conductive to allow the utility pole 100 to be electrically grounded, and is water impermeable to protect the utility pole 100 from corrosion.

As mentioned above, instead of applying a cementitious slurry to the utility pole 100, a cementitious powder can be applied to the utility pole 100 (e.g. by applying the cementitious powder to the gap 108). Water can then be added to the cementitious powder in-situ, or the cementitious powder can be left and allowed to absorb environmental water (e.g. rainwater). The cementitious product can then be allowed to cure.

Referring to FIG. 2, in order to prevent water (e.g. rainwater) from pooling around the utility pole 100, which can lead to corrosion, a diverter 114 can be installed or applied around the utility pole 100, on the top edge of the surround 112. The diverter 114 can be shaped to direct water away from the utility pole 100. The diverter 114 can be formed from a grout or polymeric material that is troweled around the utility pole 100. The diverter can optionally be or include an electrically conductive material.

A grounding grid can optionally be installed around the utility pole, for safety.

Figure 3:
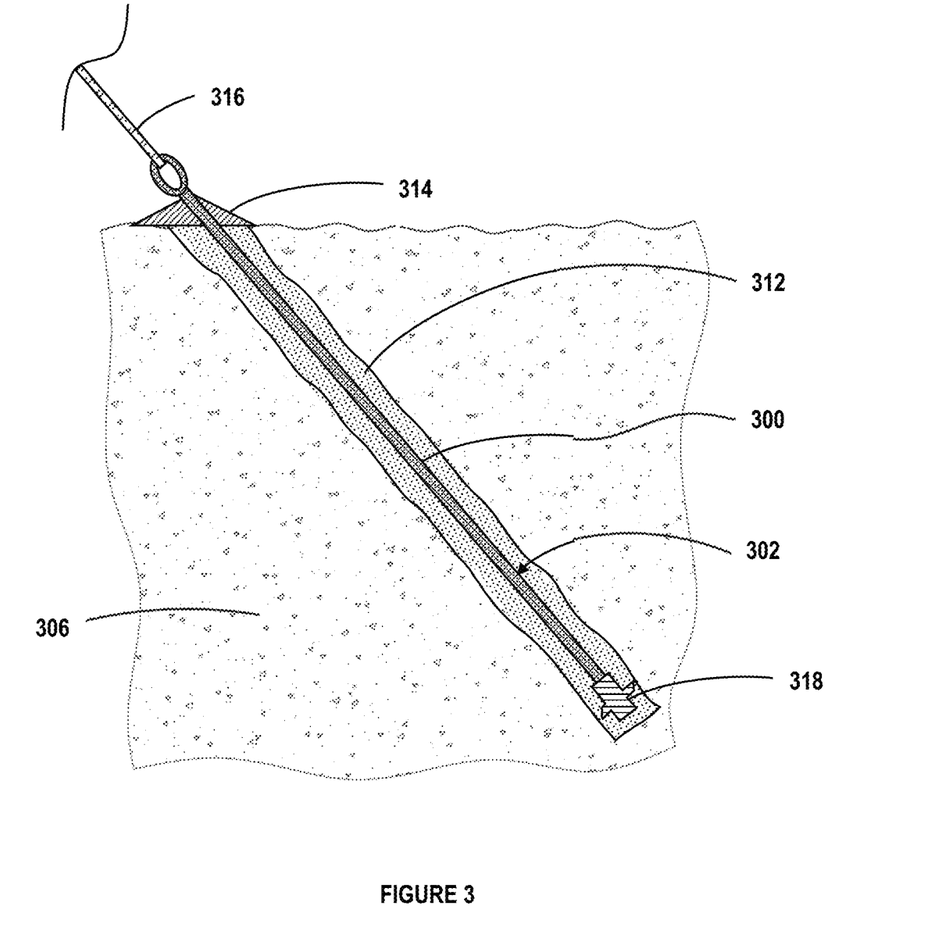
FIG. 3 is a partial and schematic cross-sectional view showing an anchor rod with a cementitious surround applied thereto.

Referring to FIG. 3, another example is shown, in which the assembly includes a metallic structure in the form of an anchor rod 300 for a guy wire 316. The anchor rod 300 is shown in situ, with the anchor rod 300 lowered into a hole that has been dug in the earth 306. In the example shown, the entire anchor rod 300 is buried. In the example shown, the hole is an auger hole dug into the earth 306 with an auger; in alternative examples, the hole can be a trench dug into the earth with a backhoe. The hole has a diameter that is slightly larger than the anchor rod 300, to leave a circumferential gap (not shown) between the anchor rod 300 and the earth 306. A cementitious slurry as described above has been poured into the hole, to fill the gap between the anchor rod 300 and the earth 306, and the slurry has cured to form the surround 312. Alternatively, a cementitious powder can be poured into the hole, to fill the gap between the anchor rod and the earth. Water can then be added to the cementitious powder in-situ, or the cementitious powder can be left and allowed to absorb environmental water (e.g. rainwater). The cementitious product can then be allowed to cure.

In the example shown, an anchor 318 is mounted to the bottom portion 302 of the anchor rod 300, to secure the anchor rod 300 in the earth. In the example shown, the anchor 318 is fully embedded in the surround 312. In alternative examples, the anchor can be either fully or partially outside of the surround 312. The anchor can be of various configurations (e.g. a plate or a nut or another configuration).

In the example shown, the assembly of FIG. 3 further includes a diverter 314, similar to the diverter 114 of FIG. 2.

Figures 4, 5:
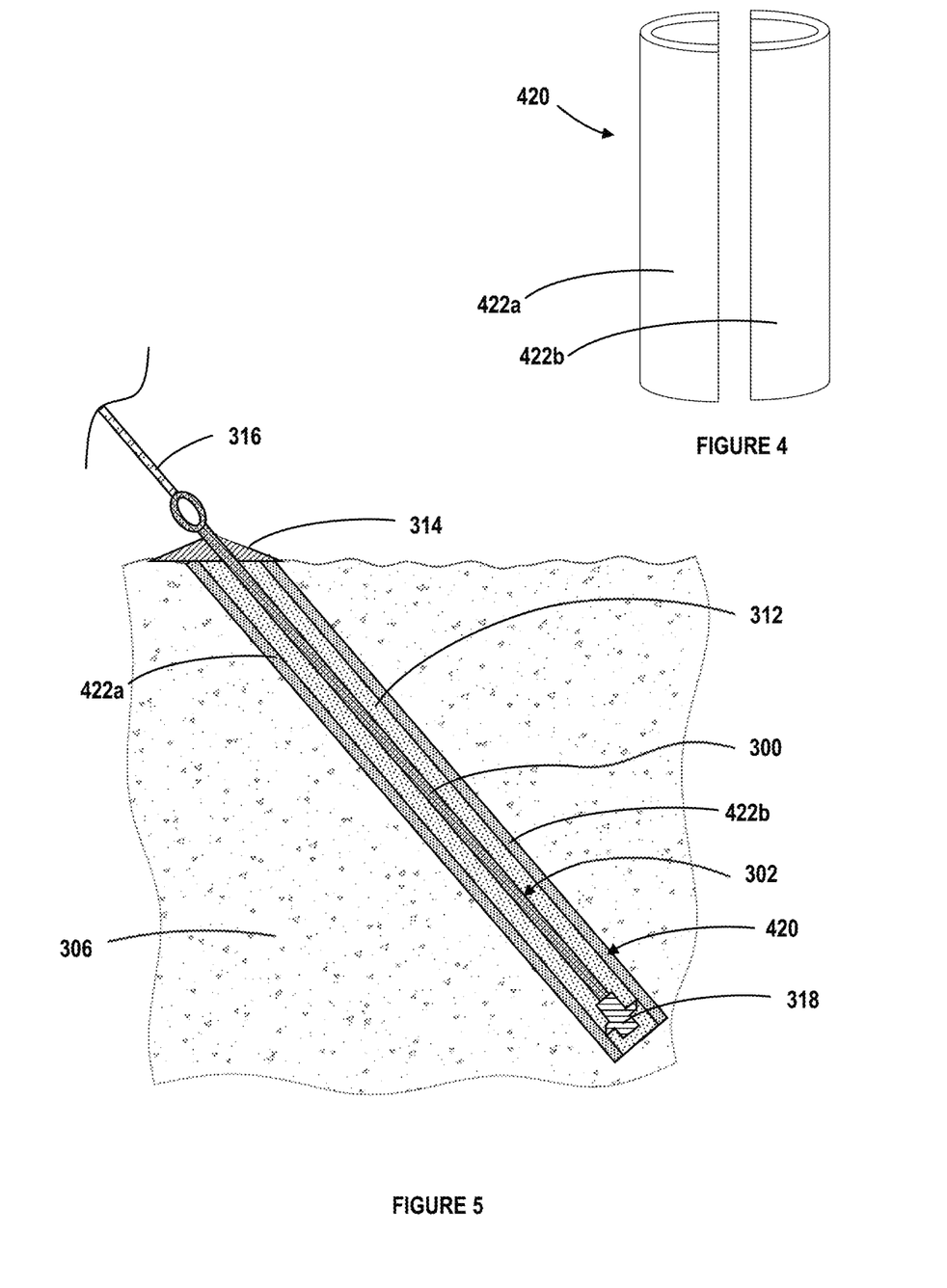
FIG. 4 is a perspective view of an example jacket usable with the cementitious surrounds described herein.
FIG. 5 is a partial and schematic cross-sectional view showing the jacket of FIG. 4 applied to the anchor rod and cementitious surround of FIG. 3.

Referring now to FIGS. 4 and 5 (where features that are like those of FIG. 3 are referred to with the same reference numerals as in FIG. 3), in some examples, a jacket 420 can be used to encapsulate the surround 312. The jacket 420 can be electrically conductive and water impermeable. For example, the jacket can include a polymeric matrix, and a particulate carbonaceous material dispersed in the polymeric matrix. Such materials are described in U.S. Pat. No. 10,333,234 B2 (Sirola et al.), which is incorporated herein by reference in its entirety. In the example shown, the jacket 420 is in the form of a tube, which is formed in two pieces, 422a, 422b, which are positioned around the surround 312.

The jacket 420 can be used in various scenarios, but may be particularly useful in repair or retro-fit scenarios. For example, in situations where an anchor rod 300 is already installed in the earth 306, it may be required to dig up the earth 306 around the anchor rod 300 for various reasons, leaving the anchor rod 300 exposed (i.e. leaving the entire anchor rod exposed, or leaving only a section of the anchor rod exposed) and in a relatively large hole (not shown) that may be too large to fill with the cementitious product (i.e. having a diameter larger than the original auger hole that was created for the anchor rod 300). In such situations, the jacket 420 can be positioned in the hole around anchor rod 300 (i.e. either around the entire anchor rod 300, or around only the exposed section of the anchor rod 300) and secured in place (e.g. using a fastener such as a zip tie). The jacket 420 can then be filled with the cementitious material, e.g. by pouring a cementitious slurry as described above into the jacket 420, to fill the jacket 420 (or by pouring a cementitious powder into the jacket 420). The slurry can then cure to form the surround 312, and the hole can be filled with earth 306. In such examples, depending on how deep the hole around the anchor rod 312 has been dug, the surround 312 can be on the entire buried portion of the anchor rod 312, or on only a section of the buried portion of the anchor rod 312 (e.g. the top section).

Jackets as described above can also be used with structures other than anchor rods, e.g. poles.

Figure 6:
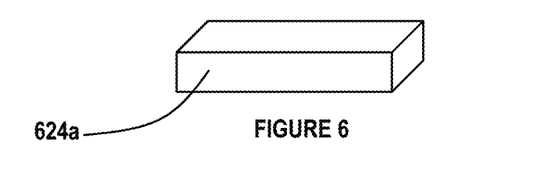
FIG. 6 is a perspective view of an example brace usable with the cementitious surrounds described herein.
Figure 7:
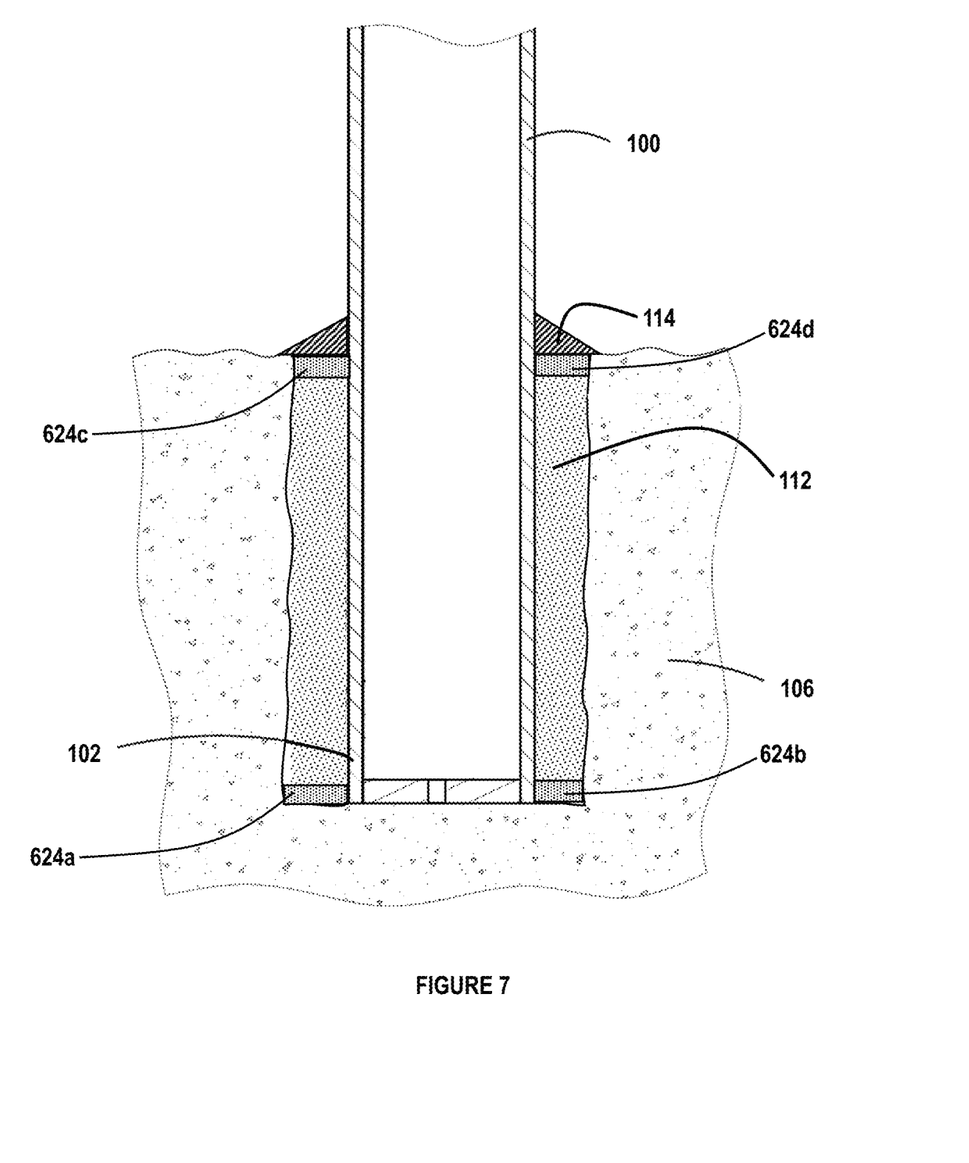
FIG. 7 is a partial and schematic cross-sectional view showing the brace of FIG. 6 applied to the utility pole and cementitious surround of FIG. 2.

Referring now to FIGS. 6 and 7 (where features that are like those of FIGS. 1 and 2 are referred to with the same reference numerals as in FIGS. 1 and 2), in some examples, one or more braces 624a-d (only one of which is shown in FIG. 6) can be embedded in the surround 112 to further support the utility pole 100, particularly during the period while the cementitious product is in the process of curing. The braces 624a-d can include a polymeric matrix, and a particulate carbonaceous material dispersed in the polymeric matrix. Such materials are described in U.S. Pat. No. 10,333,234 B2 (Sirola et al.), which is incorporated herein by reference in its entirety. The braces 624a-d can be in the form of elongate bars or rods or blocks (e.g. 4 inch×4 inch bars) that are cut to length to fit the gap between the utility pole 100 and the earth 106. To install the braces 624a-d, the bottom portion 102 of the utility pole 100 can be lowered into the hole 104 that has been dug in the earth 106 (e.g. dug into the earth 106 with an auger). The braces 624a-624d can then be positioned in the gap, around the utility pole 100, so that they are generally wedged between the utility pole 100 and the earth 106. The cementitious slurry as described above can then be applied to the utility pole, enveloping the braces 624a-624d. The slurry can then be left to cure, for example over a period of several days, to form the surround 112 with the braces 624a-624d embedded therein, as shown in FIG. 7.

In FIG. 7, four braces 624a-624d are shown (i.e. two lower braces 624a, 624b, and two upper braces 624c, 624d). However, another number of braces can be used, such as four lower braces and four upper braces.

As mentioned above, the metallic structures described herein can include metallic parts of ancillary structures (e.g. metal claddings on non-metallic structures such as wood poles). In one particular example (not shown), the ancillary structure can be a wood pole (e.g. utility pole), and the metallic structure can be a cladding on the bottom portion of the wood pole. The cladding can be, for example, a material such as a foil. The foil can be, for example, a copper foil or steel (e.g. galvanized steel) foil that is wrapped around the bottom portion of the wood pole. A wire can connect the cladding to a power system neutral of the utility pole. The bottom portion of the wood pole, together with the cladding, can be lowered into a hole that has been dug in the earth and a cementitious product (i.e. a slurry or a powder) can then be applied to the cladding and allowed to cure to form a surround, as described above.

While the above description refers to portions of the metallic structures (e.g. bottom portions) being buried in the earth and the surround being on such buried portions, it is possible that the entire metallic structure may be buried in the earth, and the surround may be on the entire metallic structure. For example, in the case of a metallic cladding on a wood pole, the entire cladding may be buried in the earth and the surround may surround the entire cladding. For further example, in the case of an anchor rod, the entire anchor rod may be buried in the earth and the surround may surround the entire anchor rod. Furthermore, the surround may in some examples be applied to only a section of the buried portion of the metallic structure. For example, in the case of repair to an anchor rod, the surround may be applied to only the section of the anchor rod that is exposed when a trench is dug (e.g. the top 3 to 4 feet of the anchor rod).

While the above description provides examples of one or more processes or apparatuses or compositions, it will be appreciated that other processes or apparatuses or compositions may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

EXAMPLES

Example 1—Material Properties of Cementitious Products

Various cementitious powders were made, as shown in Tables 1 to 3. The powders were prepared by blending the components in a pneumatic blender. The powders were stored in 55 lb bags.

TABLE 1

Composition of Cementitious Powder 1

| Component | Weight % |
| --- | --- |
| Particulate carbonaceous material: CC60 Calcined Petroleum Coke (Oxbow Calcining LLC) | 50.0 |

TABLE 1-continued

Composition of Cementitious Powder 1

| Component | Weight % |
|---|---|
| Portland Cement (Contempra Type GUL Portland Limestone Cement, St Mary's Cement) | 50.0 |

TABLE 2

Composition of Cementitious Powder 2

| Component | Weight % |
|---|---|
| Particulate carbonaceous material: CC60 Calcined Petroleum Coke (Oxbow Calcining LLC) | 70.0 |
| Portland Cement (Contempra Type GUL Portland Limestone Cement, St Mary's Cement) | 30.0 |

TABLE 3

Composition of Cementitious Powder 3

| Component | Weight % |
|---|---|
| Particulate carbonaceous material: CC60 Calcined Petroleum Coke (Oxbow Calcining LLC) | 80.0 |
| Portland Cement (Contempra Type GUL Portland Limestone Cement, St Mary's Cement) | 20.0 |

The cementitious powders were tested for electrical resistivity following a modified ASTM G187-05 procedure: Standard Test Method for Measurement of Soil Resistivity using the Two Electrode Soil Box Method. Cementitious powder (10 g) was placed in a fixture in between 2 brass platens. An Instron was used to apply a force of 192 lbs/in$^2$ to the fixture, and the resistivity of the sample (measured between the 2 brass platens) was measured using a rectifier. Results are shown in Tables 4 to 6.

The cementitious powders were then mixed with water (at various ratios set out below) to yield a cementitious slurry. Mixing was conducted using a drill with a grout mixing paddle until the slurry reached a smooth consistency. The slurry was then cured (as described below), and the cured product was tested for material properties, including water permeability, shrinkage, and compressive strength.

For water permeability tests, 55 lb of cementitious powder was combined with 3 US gallons of water. The cementitious slurry was then poured into 4 inch×8 inch PVC cylinders in 2 even layers. Each layer was rodded to remove entrained air. Lids were sealed on the cylinders and the material was allowed to cure for 28 days in the cylinder (ambient temperature and humidity conditions) before being demoulded and tested for water permeability. Water permeability tests followed ASTM D5084: Hydraulic Conductivity of Saturated Porous Materials using a Flexible Wall Permeameter—Constant Volume. The demoulded samples were placed into the permeameter and subjected to an effective stress of 2.6 psi, and the permeability rate of water through the material was calculated. Results are shown in Tables 4 to 6.

For shrinkage tests, 55 lb of cementitious powder was combined with 3 US gallons of water. Shrinkage tests followed ASTM C157: Length Change of Hardened Hydraulic-Cement Mortar and Concrete. The cementitious slurry was cast into prisms for linear shrinkage testing. Prism specimens were wet cured in lime saturated water for 28 days, followed by 28 days of air storage in a humidity and temperature controlled drying room. Shrinkage was measured after demoulding, after 28 days of wet curing, and after 4, 7, 14 and 28 days of air storage. Results (shown in Tables 4 to 6) show the shrinkage after 28 days of air storage.

For compressive strength tests, up to three water ratios were tested: 55 lb of cementitious powder combined with 1.8 US gallons of water, 55 lb of cementitious powder combined with 2.5 US gallons of water, and 55 lb of cementitious powder combined with 3.0 US gallons of water. Each cementitious slurry was poured into 4 inch×8 inch PVC cylinders in 2 even layers. Each layer was rodded to remove entrained air. Lids were sealed on the cylinders and the material was allowed to cure for 28 days in the cylinder (ambient temperature and humidity conditions) before being demoulded and tested for compressive strength. Compressive strength tests followed CAN/CSA A.23.2-14. After demoulding the samples were placed in between 2 plates. Force was applied until the material fractured. The amount of force required to fracture the material is the recorded compressive strength. Results are shown in Tables 4 to 6.

TABLE 4

Properties of Cured Surround Material 1

| Property | Value (average) |
|---|---|
| Permeability to Water (n = 2) | 2.0 × 10$^{-8}$ cm/sec |
| Shrinkage (n = 3) | 0.015% |
| Electrical Resistivity (n = 5) | 2.8-5.0 Ω · cm |
| Compressive Strength | |
| 1.8 US gallons of water/bag (n = 2) | 7005 psi (48.3 MPa) |
| 2.5 US gallons of water/bag (n = 2) | 4569 psi (34.5 MPa) |
| 3.0 US gallons of water/bag (n = 2) | 4003 psi (27.6 MPa) |

TABLE 5

Properties of Cured Surround Material 2

| Property | Value (average) |
|---|---|
| Permeability to Water (n = 4) | 1.85 × 10$^{-7}$ cm/sec |
| Electrical Resistivity (n = 8) | 0.5-2.0 Ω · cm |
| Compressive Strength 3.0 US gallons of water/bag (n = 2) | 914 psi (6.30 MPa) |

TABLE 6

Properties of Cured Surround Material 3

| Property | Value (average) |
|---|---|
| Permeability to Water (n = 4) | 1.46 × 10$^{-6}$ cm/sec |
| Electrical Resistivity (n = 6) | 0.4-3.0 Ω · cm |
| Compressive Strength 3.0 US gallons of water/bag (n = 2) | 348 psi (2.40 MPa) |

Example 2—Corrosion Protection of Metallic Structures by Cementitious Surrounds

Cementitious products were tested for their ability to protect copper, steel, and galvanized steel structures from corrosion.

Copper:

Copper samples (¾ inch×3 inch rectangular strips having a thickness of 0.2 mm (0.008 inch)) were connected to insulated wire, which was then connected to a rectifier. One strip was left bare and the second strip was encased in a 4 inch×8 inch cementitious surround.

The cementitious surround was made using a cementitious powder of the composition shown in Table 1. A cementitious slurry was made by adding 55 lbs of the cementitious powder to 3.3 US gallons of water and mixing, as described above. The copper samples were embedded in the slurry in a 4 inch×8 inch PVC cylinder as described above, and the slurry was allowed to cure for 13 days (ambient temperature and humidity conditions) before demoulding.

Figure 8:
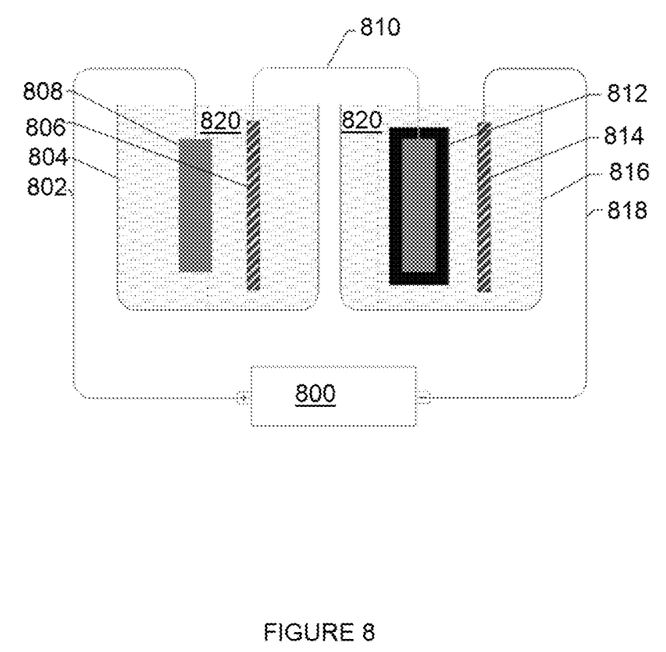
FIG. 8 shows the experimental setup of Example 2.

Both samples (i.e. bare strip and encased strip) were buried in topsoil. Sodium sulfate (20 g) was added to the soil and water was regularly added to ensure the soil was wet and salty (to simulate worst case conditions). Samples were connected to the rectifier in series, and 3 mA was applied to each sample for 60 days. The experimental setup is shown in FIG. 8. In FIG. 8, the following reference numerals are used: 800—regulated power supply; 802—insulated positive wire; 804—test container; 806—steel rebar (cathodic); 808—bare metal (anodic); 810—insulated bond wire; 812—metal encased in cementitious surround (anodic); 814—steel rebar (cathodic); 816—test container; 818—insulated negative wire; 820—soil.

The samples were then removed from the soil. The encased strip was removed from the cementitious surround. Both copper strips were then weighed. Results are shown in Table 7.

Steel:

Steel samples (1.75 inch×¾ inch rectangular sections having a thickness of ¼ inch) were connected to insulated wire, which was then connected to a rectifier. One section was left bare and the second section was encased in a 4 inch×8 inch cementitious surround. The cementitious surround was made as described above for copper; however the slurry was cured for 28 days.

Both samples (i.e. bare section and encased section) were buried in topsoil. Sodium sulfate (20 g) was added to the soil and water was regularly added to ensure the soil was wet and salty. Samples were connected to the rectifier in series, and 3 mA was applied to each sample for 30 days. The experimental setup was the same as shown in FIG. 8.

The samples were then removed from the soil. The encased section was removed from the cementitious surround. Both steel sections were then weighed. Results are shown in Table 7.

Galvanized Steel:

Galvanized steel samples were 1.75 inch×¾ inch rectangular sections having a thickness of ¼ inch. Galvanizing met ASTM A123/A123M, and the samples had a zinc coating of at least 0.025 mm (0.001 inch). The sections were connected to insulated wire, which was then connected to the rectifier. One section was left bare and the second section was encased in a 4 inch×8 inch cementitious surround. The cementitious surround was made as described above for steel. The experiment was conducted as described above for steel. Results are shown in Table 7.

The results indicate that the cementitious products disclosed herein can inhibit or prevent corrosion of metal including copper, steel, and galvanized steel.

TABLE 7

Electrical Corrosion Resistance of Various Metals

| Sample | Percentage of Sample Consumed after 30 days or 60 days (%) |
|---|---|
| Copper without Cementitious Surround (in direct contact with soil) | 94.80 |
| Copper Encased in Cementitious Surround | 0.00 |
| Steel without Cementitious Surround (in direct contact with soil) | 5.79 |
| Steel Encased in Cementitious Surround | 0.00 |
| Galvanized Steel without Cementitious Surround (in direct contact with soil) | 7.70 |
| Galvanized steel Encased in Cementitious Surround | 0.00 |

We claim:

1. An electrically grounded and corrosion-protected assembly, comprising:
    a metallic structure, wherein at least a portion of the metallic structure is buried in the earth;
    a water impermeable and electrically conductive cementitious surround applied to at least a section of the portion that is buried in the earth, wherein the surround is in direct contact with the section and is between the section and the earth; and
    an electrically conductive and water impermeable brace embedded in the surround and supporting the metallic structure, wherein the brace comprises a polymeric matrix, and a particulate carbonaceous material dispersed in the polymeric matrix.

2. The assembly of claim 1, wherein the surround has a top edge, and the assembly further comprises a diverter positioned on the top edge and extending around the metallic structure, wherein the diverter is shaped to direct water away from the metallic structure.

3. The assembly of claim 1, wherein the metallic structure is a pole.

4. The assembly of claim 1, wherein the metallic structure is an anchor rod.

5. The assembly of claim 1, wherein the metallic structure is a cladding on a non-metallic structure.

6. The assembly of claim 1, where the cementitious surround comprises a cementitious matrix and a particulate carbonaceous material dispersed in the cementitious matrix.

7. The assembly of claim 6, wherein the cementitious matrix comprises Portland cement.

8. The assembly of claim 6, wherein the particulate carbonaceous material comprises calcined petroleum coke.

9. The assembly of claim 1, wherein the cementitious surround comprises between 5 wt % and 70 wt % Portland cement, and between 30 wt % and 90 wt % calcined petroleum coke.

10. The assembly of claim 9, wherein the cementitious surround comprises up to 50% slag.

11. The assembly of claim 1, wherein the surround has a compressive strength of at least 50 psi.

12. The assembly of claim 1, wherein the surround holds the metallic structure in a generally vertical position.

13. An electrically grounded and corrosion-protected assembly, comprising:

a metallic structure, wherein at least a portion of the metallic structure is buried in the earth;

a water impermeable and electrically conductive cementitious surround applied to at least a section of the portion that is buried in the earth, wherein the surround is in direct contact with the section and is between the section and the earth; and an electrically conductive and water impermeable jacket encapsulating the surround, wherein the jacket comprises a polymeric matrix, and a particulate carbonaceous material dispersed in the polymeric matrix.

14. A method for electrically grounding and corrosion-protecting a metallic structure, comprising:

a) applying a cementitious product to at least a section of a metallic structure, wherein the cementitious product comprises a cementitious matrix and a particulate carbonaceous material dispersed in the matrix;

b) embedding an electrically conductive and water impermeable brace in the cementitious product to support the metallic structure, wherein the brace comprises a polymeric matrix and an additional particulate carbonaceous material dispersed in the polymeric matrix; and c) curing the cementitious product with the brace embedded therein, to form a water impermeable and electrically conductive cementitious surround on the section.

15. The method of claim 14, further comprising, prior to step a):

digging a hole in the earth for the metallic structure, wherein the hole is sized to leave a gap between the metallic structure and the earth; and lowering at least a bottom portion of the metallic structure into the hole;

wherein the section is a section of the bottom portion.

16. The method of claim 14, wherein the cementitious product is a cementitious slurry.

17. The method of claim 16, wherein the method further comprises combining a cementitious powder with water to form the cementitious slurry, wherein the cementitious powder is combined with the water in a ratio of less than or equal to about 3 US gallons of water per 55 lb of cementitious powder.

18. The method of claim 17, wherein the cementitious powder is combined with the water in a ratio of between about 1.5 and about 3.0 US gallons of water per 55 lb of cementitious powder.

19. The method of claim 16, further comprising applying the cementitious slurry to the hole before lowering at least the bottom portion of the metallic structure into the hole.

20. The method of claim 14, wherein the cementitious product is a cementitious powder, and the method further comprises adding water to the cementitious powder.

21. The method of claim 14, further comprising, prior to step a):

applying a jacket to the section, wherein the jacket is sized to leave a gap around the section.

22. The method of claim 14, wherein the metallic structure is a pole or an anchor rod for a guy wire or a cladding on a non-metallic pole.

23. The method of claim 22, wherein the surround has a width of between about 0.5 inch and about 10 inches.

24. The method of claim 22, further comprising applying a diverter around a top edge of the surround, to direct water away from the metallic structure.

25. The method of claim 14, wherein the cementitious matrix comprises Portland cement.

26. The method of claim 14, wherein the particulate carbonaceous material comprises calcined petroleum coke.

27. The method of claim 14, wherein the cementitious surround comprises between 5 wt % and 70 wt % Portland cement, and between 30 wt % and 90 wt % calcined petroleum coke.

* * * * *